(12) United States Patent
Clough et al.

(10) Patent No.: US 7,200,844 B2
(45) Date of Patent: Apr. 3, 2007

(54) USER INSTALLATION OF IMAGING DEVICE CONTROL SYSTEM

(75) Inventors: James Clough, Boise, ID (US); Darrel Cherry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 10/215,160

(22) Filed: Aug. 8, 2002

(65) Prior Publication Data

US 2004/0031032 A1 Feb. 12, 2004

(51) Int. Cl.
G06F 9/445 (2006.01)
(52) U.S. Cl. .................................... 717/171
(58) Field of Classification Search ............... 717/173, 717/178, 170, 171; 709/220–223; 382/305, 382/318
See application file for complete search history.

(56) References Cited

U.S. PATENT DOCUMENTS

| | | | |
|---|---|---|---|
| 5,613,160 A | 3/1997 | Kraslavsky et al. | |
| 5,623,604 A | 4/1997 | Russell et al. | |
| 5,974,454 A | 10/1999 | Apfel et al. | |
| 6,038,621 A | 3/2000 | Gale et al. | |
| 6,055,632 A | 4/2000 | Deegan et al. | |
| 6,070,012 A | 5/2000 | Eitner et al. | |
| 6,078,951 A | 6/2000 | Pashupathy et al. | |
| 6,094,679 A | 7/2000 | Teng et al. | |
| 6,167,567 A | 12/2000 | Chiles et al. | |
| 6,205,579 B1 | 3/2001 | Southgate | |
| 6,289,023 B1 | 9/2001 | Dowing et al. | |
| 6,308,205 B1 | 10/2001 | Carcerano et al. | |
| 6,618,162 B1* | 9/2003 | Wiklof et al. | 358/1.15 |
| 6,751,648 B1* | 6/2004 | Kakimoto et al. | 709/203 |
| 2002/0026541 A1* | 2/2002 | Suzuki et al. | 710/8 |
| 2002/0144257 A1* | 10/2002 | Matsushima | 717/178 |

* cited by examiner

Primary Examiner—Mary Steelman

(57) ABSTRACT

An imaging device such as, for example, a printer, scanner, or copier is provided that includes a processor circuit having a processor and a memory and a number of physical components that perform at least one imaging function, the physical components being controllably coupled to the processor circuit. The memory includes an allocated portion of memory to accommodate the storage of a control system to be installed therein. A control system installer is stored in the memory and is executable by the processor. The control system installer includes logic that downloads the control system from a remote device via a network, and, logic that installs the control system in the allocated portion of the memory.

23 Claims, 4 Drawing Sheets

USER INSTALLATION OF IMAGING DEVICE CONTROL SYSTEM

BACKGROUND OF THE INVENTION

Peripheral devices such as printers, copiers, scanners and the like are manufactured and sold to many different individuals and organizations. Each individual and organization might use a peripheral device in a different manner or in a different environment. For example, in an office setting, a peripheral device might be located on a network and shared by many individuals. In such an environment, a peripheral device may be subject to heavy use. In another example, other peripheral devices may be attached to a personal computer and experience occasional use. In addition, different individuals and organizations may desire correspondingly different features or operational functionality in the same type of peripheral device.

Manufacturers often attempt to address the many ways a peripheral device may be used and to provide for all of the desired features demanded of such devices by diverse individuals and organizations. To do this, manufacturers may choose to take a "one size fits all" approach to manufacturing in which peripheral devices are created to include as many features as possible so that the same device can be marketed to a larger audience. While this approach may achieve a certain level of manufacturing efficiency, such an approach may result in more expensive peripheral devices. Specifically, such peripheral devices may include circuitry or physical structure needed to include as many features as possible, thereby resulting a greater cost basis per unit.

In another approach, a manufacturer may design factories to produce individualized products that cater to the respective desires of a diverse customer base. Unfortunately, providing multiple versions of various peripheral devices catered to the specific needs of individuals and entities can stress manufacturing resources and can negatively impact manufacturing efficiency.

SUMMARY

In light of the forgoing, an imaging device, a method, and an automated installer program are provided. In one embodiment, the imaging device includes a processor circuit having a processor and a memory, and, a number of physical components that perform at least one imaging function, the physical components being controllably coupled to the processor circuit. The imaging device further comprises an allocated portion of memory to accommodate the storage of a control system to be installed therein, and a control system installer stored in the memory and executable by the processor. The control system installer comprises logic that downloads the control system from a remote device via a network, and, logic that installs the control system in the allocated portion of the memory.

In another embodiment, a method is provided for installing a control system in an imaging device. In this regard, the method comprises providing the imaging device having a processor circuit with a processor and a memory, providing an allocated memory in the memory to accommodate the storage of the control system to be installed therein, controllably coupling a number of physical components in the imaging device to the processor circuit, downloading the control system from a remote device via a network, and installing the control system in the allocated memory.

In still another embodiment, the present invention provides for an automated installer program embodied in a computer readable medium for installing a control system in an imaging device. In this respect, the automated installer program comprises code that facilitates a user navigation through a number of control system options to select the control system to be installed in an allocated memory of the imaging device and code that generates a request to download the control system, wherein the control system is compatible with the imaging device. The automated installer program further comprises code that installs the control system in an allocated memory in the imaging device.

The present invention further provides for other embodiments as are described below and in the claims appended hereto.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
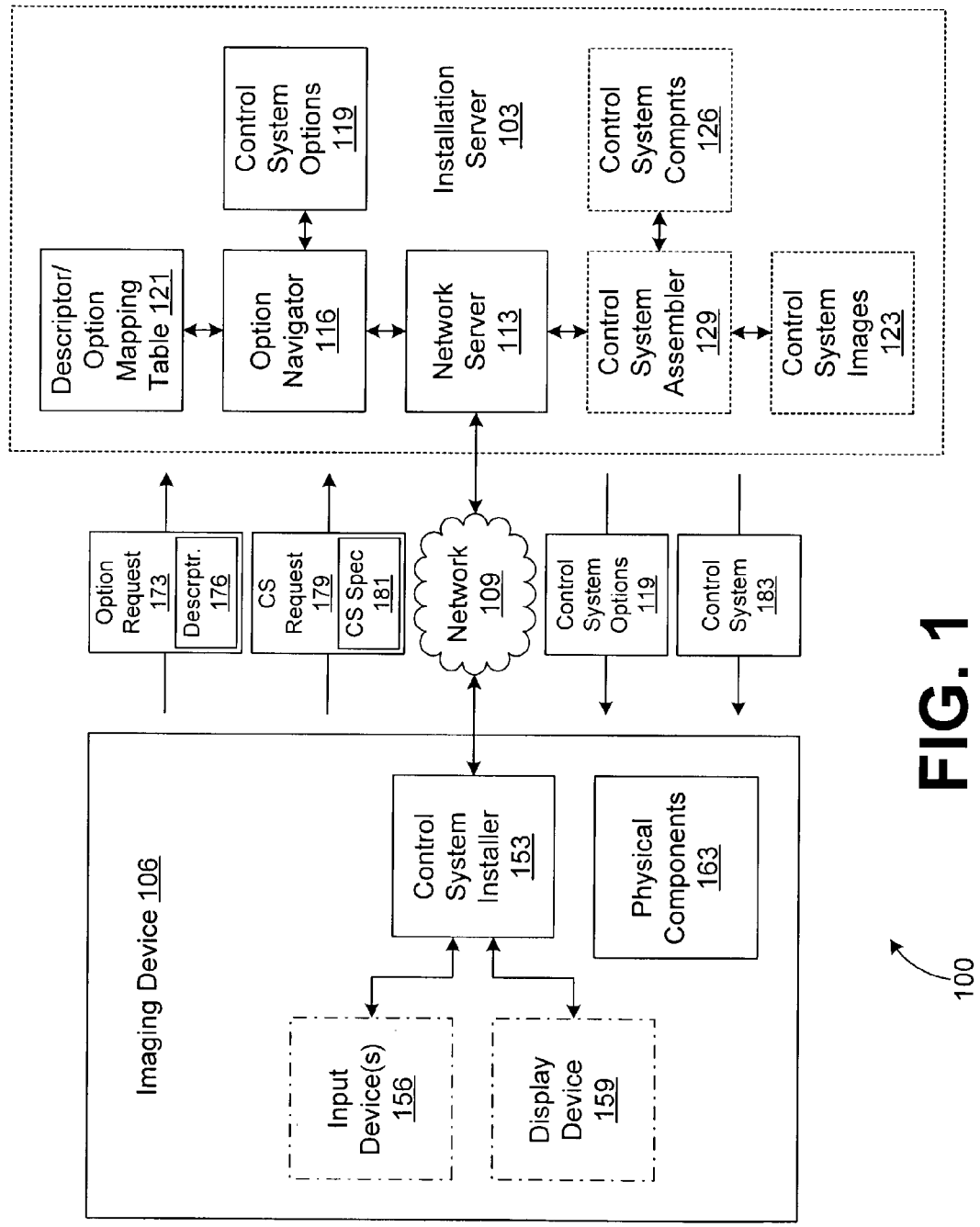
FIG. 1 is a block diagram of an installation network with a peripheral device and an installation server, both of which are coupled to a network.

With reference to FIG. 1, shown is a functional block diagram of an installation network 100 according to an embodiment of the invention. The installation network 100 includes an installation server 103 and an imaging device 106, both of which are coupled to a network 109. The imaging device 106 may be, for example, a printer, scanner, copier, or other imaging device, or a combination of any two or more of such devices. The installation server 103 may be, for example, a web server that operates according to the dictates of the HyperText Transfer Protocol (HTTP) or other type of server operating according to a different protocol.

The installation server 103 includes a network server 113 and an option navigator 116. The option navigator 116 operates to present a number of control system options 119 to the imaging device 106 as will be discussed. The installation server 103 also includes a descriptor/option mapping table 121, the function of which will be described. The network server 113 operates to provide the imaging device 106 with one of a number of control systems that may be embodied in a number of control system images 123 or may be assembled from a number of control system components 126. In the case that a control system is assembled from the control system components 126, the control system assembler 129 may be employed to package select ones of the components 126 into a complete control system that is provided to the imaging device 106. The option navigator 116 and the control system assembler 129 may be implemented, for example, as Java Scripts or servlets, etc.

The imaging device 106 includes a control system installer 153 that may interface with, for example, one or more input devices 156 and a display device 159. The imaging device 106 also includes a number of physical components 163. The physical components 163 are those components within the imaging device 106 that provide for its general operation. For example, in the case of the imaging device 106 is a printer, the physical components 163 may include various rollers, paper path devices, heating elements, print heads, ink jet heads, laser printing structures, or other such components. According to one embodiment of the present invention, the imaging device 106 is characterized by the fact that it does not include a control system that can control the operation of the physical components 163 in accomplishing the tasks for which the imaging device 106 is designed. Alternatively, the imaging device 106 may include a control system that is either inadequate for the purposes of the user or needs to be updated as per user requirements.

Next the general operation of the installation network 100 is described in installing a proper control system onto the imaging device 106 to facilitate the operation thereof. Specifically, the control system that is installed in the imaging device 106 controls the operation of the physical components 163 in performing at least one imaging function. The imaging function may be, for example, a printing function, a copying function, a scanning function, or other imaging function.

The installation of a control system in the imaging device 106 may be accomplished automatically upon initial startup. Alternatively, a control system may be installed in the imaging device 106 whenever desired by a user by manually implementing an installation operation in the imaging device 106. In the second situation, a user may install a new control system in the imaging device 106 over a preexisting control system that may be, for example, obsolete or undesirable for one or more reasons. To install a control system on the imaging device 106, the control system installer 153 downloads a control system from the installation server 103 or other remote device that is coupled to the imaging device 103 through a network 109 or connection.

Assume, for example, that a user connects the imaging device 106 to the network 109 for the first time. Upon startup, the control system installer 153 is executed in order to download an appropriate control system onto the imaging device 106 so that it can function. Until such time, the imaging device 106 essentially includes all physical components 163 and the control system installer 153 without the necessary control system to control and otherwise drive the physical components 163 to perform the various imaging functions for which the imaging device 103 is designed. Upon execution, the control system installer 153 first determines whether an active network connection has been created thereby allowing the control system installer 153 to communicate with the installation server 103 or other designated remote device over the network 109.

However, before communications between the control system installer 153 and the installation server 103 may occur, the control system installer 153 must determine its network address associated with the imaging device 106 so that the installation server 103 will be able to respond back to the control system installer 153. In order to determine a network address for the imaging device 106, the control system installer 153 may display a request on the display device 159 for the user to input the appropriate network address assigned to the imaging device 106 using the input devices 156. In this respect, the input devices 156 may be, for example, push buttons, a key pad, a keyboard or other such devices.

Alternatively, the control system installer 153 may automatically determine the network address assigned to the imaging device 106 by communicating with a network administrator in cases where the imaging device 106 is coupled to a network such as, for example, a local area network or other such arrangement. This may be done using, for example, a Dynamic Host Configuration Protocol (DHCP) or other appropriate protocol in which the control system installer 153 may interface with a server on the local area network to obtain the assigned configuration, etc. In obtaining the network address as such, the control system installer 153 may also obtain a subnet mask and gateway, etc.

Once an appropriate network address assigned to the imaging device 106 has been obtained, the control system installer 153 then may send one or more option requests 173 to the installation server 103 for one or more control system options 119 relating to the respective control system(s) that may be installed on the imaging device 106. The control system installer 153 includes one or more descriptors 176 in the option request 173 that are associated with the imaging device 106. The descriptors 176 may be, for example, a model name or serial number of the imaging device 106, a processing capacity of the imaging device 106, a memory capacity of the imaging device or other descriptive information. The descriptor 176 informs the installation server 103 precisely what the capabilities of the imaging device 106 are so that the installation server 103 may properly identify a suitable control system for the imaging device 106 that is compatible therewith. Thus, the installation server 103 may include a number of different control systems that may be installed within a corresponding number of different types of imaging devices 106.

Upon receiving the one or more option requests 173, the network server 113 interfaces with the option navigator 116 that identifies one or more control system options 116 that are responsive to the respective option request 173. The act or function of "receiving" a request or other item of data as contemplated herein generally involves accepting data from an external communications system such as the network 109 and storing the data in a memory for future processing. The control system options 119 relate to or are associated with the various different permutations of the control systems or control system options that may be installed on the imaging device 106. The option navigator 116 selects various control system options 119 to transmit to the control system installer 153 in response to the option request 173. The option navigator 116 employs the one or more descriptors 176 included in the option request 173 to identify those control system options that are compatible with the capabilities of the imaging device 106. To do this, the option navigator 116 consults the descriptor/option mapping table 121, for example, that maps the various different potential descriptors 176 associated with each of the potential imaging devices 106 with the various control system options 119. Thus, the descriptor/option mapping table 121 provides the tool by which the installation server 103 can determine which control system options 119 are compatible with the imaging device 106.

Once the appropriate control system options 119 that are compatible with the imaging device 106 have been determined, the option navigator 116 packages the control system options 119 according to a predetermined protocol recognized by the imaging device 106. Then, the option navigator 116 provides the packaged control system options 119 to the network server 113 that, in turn, transmits them to the control system installer 153 in the imaging device 106. The control system installer 153 then facilitates the display and navigation through the control system options 119 using the display device 159 and the input devices 156 so that a user can ultimately select the various options relative to the control system that they wish to install on the imaging device 106. Ultimately, when the navigation through the control system options 119 is complete and all selections have been made, then the control system installer 153 generates a control system request 179 that includes a control system specification 181. The control system specification 181 has information that the network server 113 may employ to identify the desired control system for the imaging device 106 from a number of control systems available in the installation server 103. The control system specification 181 may include, for example, a model number, uniform resource locator, a list of selected options, or other information, etc. The control system installer 153 then transmits the control system request 179 to the installation server 103.

When the control system request 179 is received by the network server 113, the network server 113 provides the control system request 179 to the control system assembler 129. The control system assembler 129 then obtains the requested control system based upon the control system specification 181 included in the control system request 179. The control system assembler 129 may obtain the control system in one of a number of different ways. For example, in some cases the various permutations of control systems that are available may be stored as complete control system images 123. In such case, the control system assembler 129 need only access the control system image 123 that matches the control system specification 181 and provide the same to the network server 113. The network server 113 then sends the control system 183 in the form of the image to the control system installer 153 in response to the control system request 179.

Alternatively, the control system 183 may need to be assembled from the control system components 126, where each component relates to one or more features of the various control systems that may be required. In this respect, the control system components 126 may be one or more objects or other modules. In such case, the control system assembler 129 may access the needed control system components 126 based upon the information contained in the control system specification 181 and create a complete control system 183 therefrom. In assembling the control system components 126 to create a complete control system 183, the control system assembler 129 packages the control system components 126 according to a predetermined protocol that is understood by the control system installer 153. This is done so that the control system installer 153 is able to perform the installation of the control system 183 without confusion that might cause the installation attempt to be aborted.

Once the control system 183 is received by the imaging device 106, the control system installer 153 takes steps to install the control system 183 in the imaging device 106. In this regard, the control system 183 may be installed in an allocated portion of a memory that resides within the imaging device 106. To install the control system 183 in the allocated memory, for example, the control system installer 153 may write the control system 183 to the allocated portion of the memory. Assuming that the control system 183 is downloaded upon an initial startup of the imaging device 106, then the control system 183 is written into the allocated memory which is in an available condition such that there is no other logical code stored therein. Alternatively, in the case that a user is reinstalling a new control system 183 over an existing control system, then the control system 183 is written over the previously existing control system in the imaging device 106.

Due to the fact that the control system 183 is installed in the imaging device 106 in the manner described above, significant advantages are realized. For example, the control system 183 is of a minimal size including only the functionality desired by the user. This translates into smaller memories within the imaging devices 106 with corresponding reductions in cost. Also, the functions performed by the imaging device 106 are specifically catered to the specific requirements and/or preferences of a user. The control system 183 need not be installed on a factory floor, thereby resulting in greater efficiencies and reduced cost. Additionally, control systems 183 may be updated in imaging devices 106 as they are eventually revised to provide for various enhancements, etc. Also, the imaging device 106 is better utilized because it includes the needed features or is tailored to the application for which the imaging device 106 is used. There may also be additional advantages and benefits not listed herein that may be realized by practicing the various embodiments of the present invention.

Figure 2:
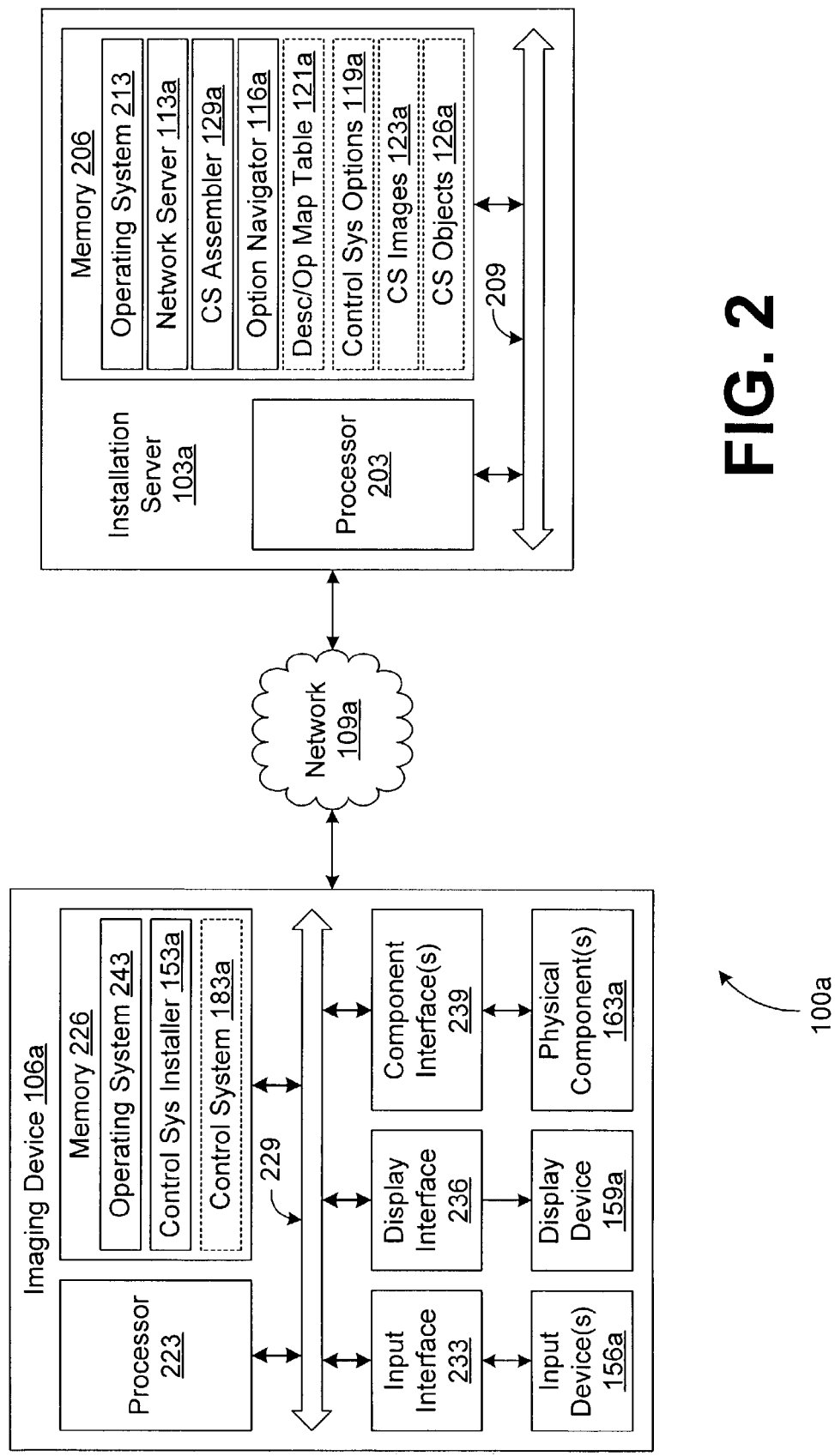
FIG. 2 is a block diagram of one embodiment of the installation network of FIG. 1.

With reference to FIG. 2, shown is one embodiment of the installation network 100 (FIG. 1), described herein as installation network 100a. The installation network 100a provides for an installation server 103a and an imaging device 106a both of which are coupled to a network 109a. The installation server 103a includes a processor circuit having a processor 203 and a memory 206, both of which are coupled to local interface 209. The local interface 209 may be, for example, a data bus with an accompanying control/address bus as can be appreciated by those with ordinary skill in the art.

Stored on the memory 206 and executable by the processor 203 are an operating system 213, a network server 113a, a control system assembler 129a, and an option navigator 116a. In addition, the control system options 119a, descriptor/option mapping table 121a, control system images 123a, and control system objects 126a are also stored in the memory 206.

The imaging device 106a also includes a processor circuit having a processor 223 and a memory 226, both of which are coupled to a local interface 229. The local interface 229 may be, for example, a data bus with an accompanying control/address bus as can be appreciated by those with ordinary skill in the art. The imaging device 106a also includes one or more input devices 156a, a display device 159a and one or more physical components 163a. The one or more input devices 156a are coupled to the local interface 229 by an input interface 233. Likewise, the display device 159a and the physical components 163a are all coupled to local interface 229 by a display interface 236 and one or more component interfaces 239, respectively. In this regard, the input interfaces 233, display interface 236, and component interfaces 239 may be, for example, interface circuits that include appropriate buffer circuitry as can be appreciated by those with ordinary skill in the art. The input interfaces 233 allow information entered using the input devices 156a to be made available to the processor 223 through the local interface 229. Likewise, the display interface 236 allows the processor 223 to generate appropriate displays on the display device 159a. Also, the component interfaces 239 provide for processor control of the physical components 163a.

The imaging device 106a also includes one or more components that are stored on the memory 226 and are executable by the processor 223. These include, for example, the operating system 243 and the control system installer 153a. The memory 226 also includes an allocated portion in which the control system 183a is stored. Upon initial startup of the imaging device 106a, the control system 183*a* is not stored in the memory 226 and needs to be downloaded from the installation server 103*a* and installed in the allocated portion of the memory 226 (hereinafter referred to as the "allocated memory"). Once the control system 183*a* is installed in the allocated memory, then the imaging device 106*a* is ready to perform the imaging operations for which it is designed.

The memories 206 and 226 are defined herein as both volatile and nonvolatile memory and data storage components. Volatile components are those that do not retain data values upon loss of power. Nonvolatile components are those that retain data upon a loss of power. Thus, the memories 206 and 226 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 203 and 223 may represent multiple processors and each of the memories 206 and 226 may represent multiple memories that operate in parallel processing circuits, respectively. In such a case, each of the local interfaces 209 and 229 may be an appropriate network that facilitates communication between any two of the multiple processors, between any processor and any of the memories, or between any two of the memories, etc. The processors 203 and 223 may be electrical, optical, or molecular in nature.

The operating systems 213 and 243 are executed to control the allocation and usage of hardware resources in the installation server 103*a* and the imaging device 106*a*, respectively, such as the memory, processing time and peripheral devices. In this manner, the operating systems 213 and 243 serve as the foundation on which applications depend as is generally known by those with ordinary skill in the art.

Figure 3:
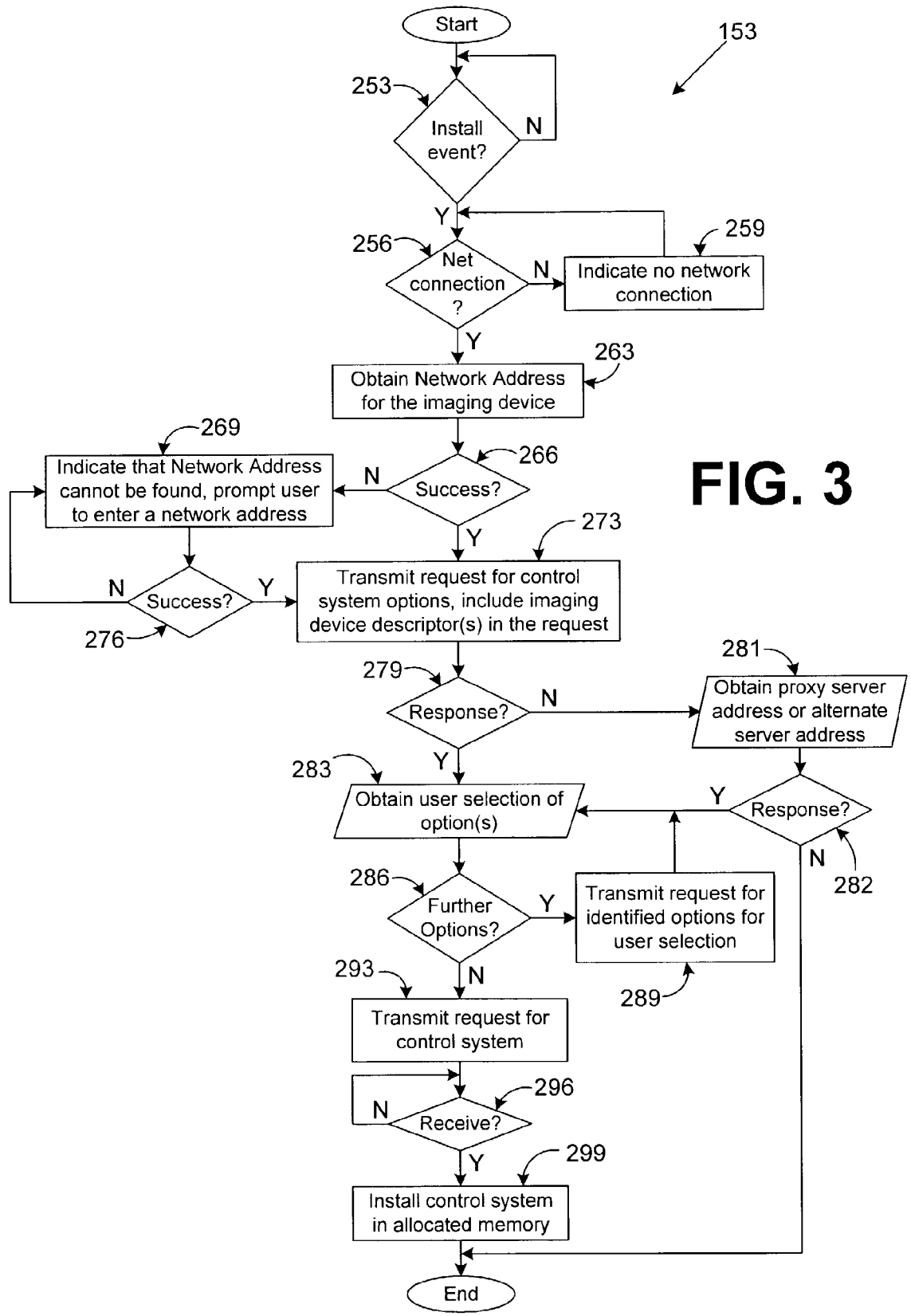
FIG. 3 is a flow chart of a control system installer executed in a peripheral device of the installation network of FIG. 2.

With reference to FIG. 3, shown is a flow chart that illustrates at least some functions of the control system installer 153 according to an embodiment of the present invention. Alternatively, the flow chart of FIG. 3 may be viewed as depicting steps of a method implemented in the imaging device 106 (FIG. 1) or the imaging device 106*a* (FIG. 2) to install a desired control system 183/183*a* (FIG. 1/FIG. 2) according to an embodiment of the present invention.

Beginning with box 253, the control system installer 153 determines whether an installation event has occurred that requires the installation of a control system 183/183*a* in the imaging device 106/106*a*. An installation event occurs, for example, upon the first startup of the imaging device 106/106*a* when the imaging device 106/106*a* is first coupled to a network such as, for example, a local area network, etc., and then powered up. Alternatively, the imaging device 106/106*a* may be coupled to a computer system or other device that is in turn coupled to an appropriate network.

Alternatively, an installation event may be initiated by a user by manipulating input devices 156/156*a* (FIG. 1/FIG. 2) to enter appropriate inputs. In such a circumstance, a user may wish to replace a preexisting control system 183/183*a* that is currently stored in the allocated memory in the imaging device 106/106*a*. Assuming that an installation event has occurred exists in box 253, the control system installer 153 proceeds to box 256 in which it is determined whether a network connection has been established between the imaging device 106/106*a* and a network 109/109*a* (FIG. 1/FIG. 2). This assumes at startup that the user has coupled the imaging device 106/106*a* to an appropriate network 109/109*a* that may be, for example, a local area network, wide area network, the internet or other appropriate network or a combination of any two or more of the above networks. The imaging device 106/106*a* may be coupled to the network 109/109*a* either directly or indirectly through a host device, etc.

If no network connection is detected in box 256, the control system installer 153 proceeds to box 259 in which the control system installer 153 indicates to the user that there is no network connection. The indication may be created by displaying an appropriate message on the display device 159/159*a* (FIG. 1/FIG. 2). Thereafter, the control system installer 153 reverts back to box 256.

On the other hand, assuming that a network connection is detected in box 256, then the control system installer 153 proceeds to box 263 to obtain a network address for the imaging device 106/106*a*. This may be done, for example, by using any one of a number of appropriate protocols such as, for example, the Dynamic Host Configuration Protocol (DHCP), Boot Protocol (BOOTP), Reverse Address Resolution Protocol (RARP), or by manual entry. The network address of the imaging device 106/106*a* may be, for example, an internet protocol (IP) address or other network address as is appropriate to allow the imaging device 106/106*a* to communicate with the installation server 103/103*a* over the network 109/109*a*.

If in box 266 the control system installer 153 was unsuccessful in automatically obtaining the network address of the imaging device 106/106*a*, then the control system installer 153 moves to box 269. Otherwise, the control system installer 153 proceeds to box 273. In box 269, an indication is generated on the display device 159/159*a* indicating that the network address for the imaging device 106/06*a* cannot automatically be obtained. In addition, the control system installer 153 prompts the user with an appropriate message on the display device 159/159*a* to enter an appropriate network address for the imaging device 106/106*a*. In box 276, if a proper network address was successfully entered by the user, then the control system installer 153 proceeds to box 273. Otherwise, the control system installer 153 reverts back to box 269 to generate an indication that the network address was unacceptable and to obtain another address from the user. The control system installer 153 may determine whether the network address is proper, for example, by transmitting a verification request to the installation server 103/103*a* or other server and waiting for a predetermined period of time for a response. If the response is not forthcoming within the period of time, then it may be assumed that the network address was incorrect and the response could not be received. Another approach to verify the network address is to send an Internet Control Message Protocol (ICMP) packet or "ping" packet to a configured gateway associated with the imaging device 106/106*a*. If an appropriate response is received, then the network address is verified. Such an approach may be more successful where proxy servers are employed to access the network 109, etc. In addition, other approaches may be employed to verify the network address. Initially, the network address of the installation server 103/103*a* or other server may be stored, for example, in the memory 226 or hard coded in the control system installer 153 itself.

In box 273, the control system installer 153 generates a request for control system options through which the user may navigate to determine the precise control system 183/183*a* to be installed in the imaging device 106/106*a*. The control system installer 153 includes one or more descriptors that are associated with the imaging device 106/106*a* that provide information for the installation server 103/103*a* to determine which options are compatible with the hardware constraints and other aspects of the imaging device 106/106*a*. Thereafter, in box 279, the control system installer 153 waits to receive an appropriate response from the installation server 103/103*a*. Assuming that an appropriate response with various options has been received in box 279, then the control system installer 153 proceeds to box 283.

On the other hand, if no response is forthcoming then the control system installer 153 proceeds to box 281 to obtain manual entry of a proxy server address through which the request for control system options is to be routed. Such may be necessary where the imaging device 106 is situated behind a firewall that prevents the request from being sent directly to the installation server 103. Alternatively, the control system installer 153 may obtain manual entry of an alternative server address to which the request may be sent in cases where the control system 183 and other modules stored on the installation server are downloaded to such an alternative server other than the installation server 103. Such may be the case where a particular user wishes to control the location from where the control system 183 is obtained for security reasons, etc.

In either case, the control system installer 153 proceeds to box 282 in which it is determined whether a proper response was received from the installation server 103 (through a proxy server) or from an alternative server. If so, then the control system proceeds to box 283. Otherwise, the control system installer 153 indicates to a user that the installation failed and ends as shown.

In box 283 the user is provided with an opportunity to select desired options relative to the control system to be installed on the imaging device 106/106*a*. To obtain the selections from the user, the control system installer 153 may cause appropriate messages to be displayed on the display device 159/159*a* and the user may manipulate appropriate input devices 156/156*a* to indicate their selections.

In box 286, if there are subsequent options to be obtained relative to current options obtained by the user, then the control system installer 153 proceeds to box 289. Such subsequent options may relate, for example, to current options chosen. Otherwise, the control system installer 153 progresses to box 293. In box 289 the control system installer 153 generates and transmits a request for the subsequent control system options 119 to facilitate further user selections, etc. Thereafter, the control system installer 153 reverts back to box 283. Thus, boxes 283, 286 and 289 provide for a navigation through a number of different options that a user can select relative to the various control systems 183/183*a* that may be available to be installed on the imaging device 106. In this respect, a user may choose the specific control system 183/183*a* to be installed on the imaging device 106 that is catered to the user's particular needs or to the environment in which the imaging device 106 must operate. Additionally, to facilitate the user selection of the various options presented in box 283, the control system installer 153 may generate the selections on the display device 159/159*a* and the user may manipulate appropriate input devices 156/156*a* to indicate an appropriate selection of the various options presented.

Assuming there are no further options to be chosen in box 286 and that the user has ultimately selected the desired control system 183/183*a*, then the control system installer 153 proceeds to box 293. In box 293 the control system request 179 is generated and transmitted to download the selected control system 183. The control system request 179 (FIG. 1) may be generated automatically, for example, when a user indicates through appropriate inputs that the selection of the various options available is complete, etc. Then, in box 296, the control system installer 153 waits to receive the control system 183/183*a* from the installation server 103 or other remote device. Assuming that the control system 183/183*a* is received, then in box 299 the control system installer 153 installs the control system 183/183*a* in the allocated memory of the imaging device 106/106*a*. In doing so, the control system installer 153 may write the control system 180/183 to the allocated memory. In this respect, the allocated memory may be, for example, both nonvolatile and rewriteable. Thereafter, the control system installer 153 ends.

Figure 4:
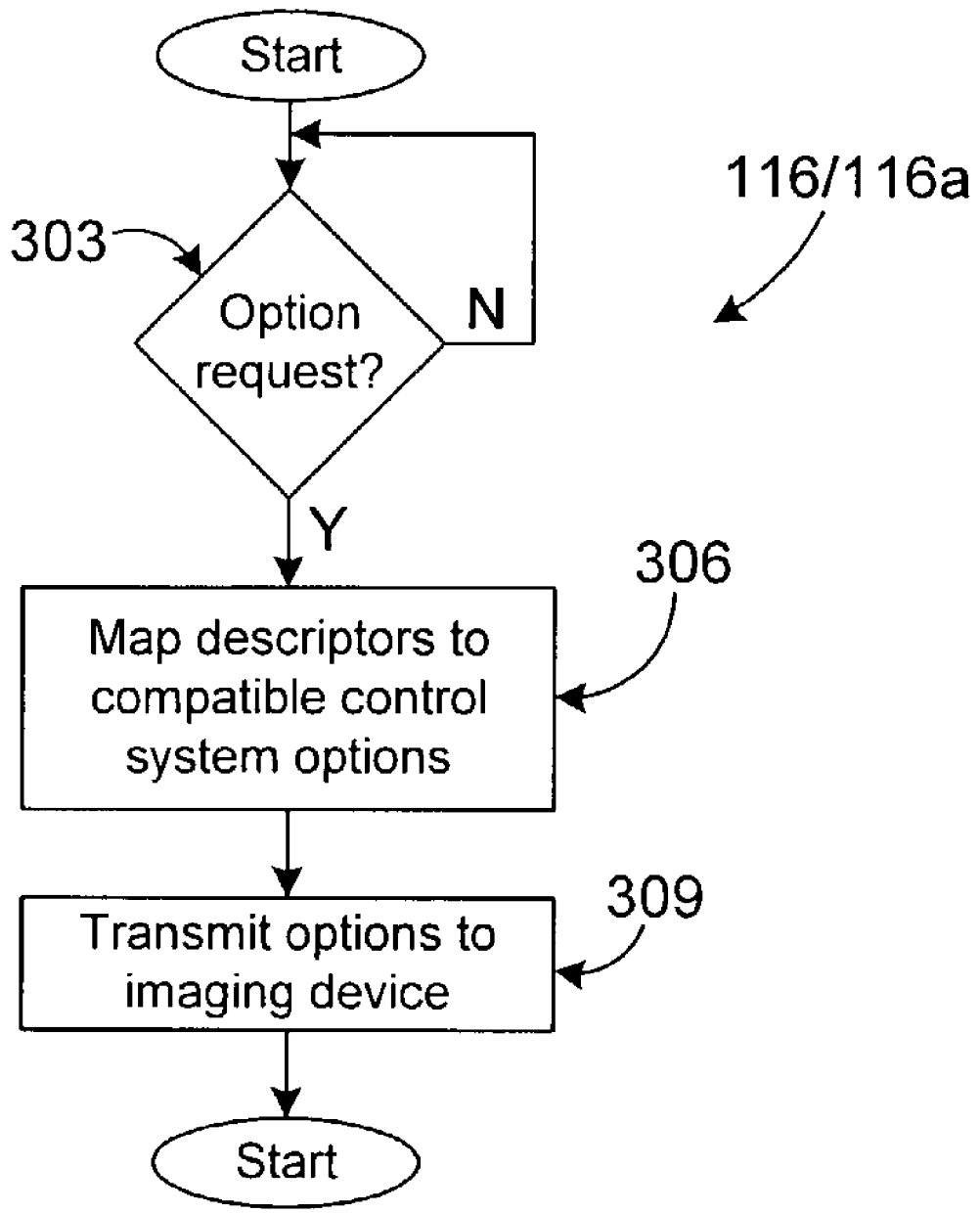
FIG. 4 is a flow chart of an option navigator executed in the installation server of FIG. 2.

Referring next to FIG. 4, shown is a flow chart of at least some functions of the option navigator 116/116*a* (FIG. 1/FIG. 2) according to an embodiment of the present invention. Alternatively, the flow chart of FIG. 4 may be viewed as steps of a method implemented in the installation server 103/103*a* to provide appropriate options in response to a request for control system options 119/119*a* (FIG. 1/FIG. 2) from the imaging device 106/106*a* (FIG. 1/FIG. 2).

Beginning with box 303, the control system navigator 116/116*a* waits to receive an option request 173 originating from the imaging device 106. Assuming that an option request 173 is received, then in box 306 the descriptors 176 (FIG. 1) from the option request 173 are mapped to corresponding control system options 119/119*a* (FIG. 1/FIG. 2) that are compatible with the imaging device 106/106*a*. Then, in box 309, the identified options are transmitted to the imaging device 106/106*a* according to an appropriate communications protocol employed by the imaging device 106 and installation server 103. Thereafter, the control system navigator 116/116*a* ends.

Although the control system installer 153, option navigator 116, control system assembler 129 and other components may be embodied in software or code executed by general purpose hardware as discussed above, as an alternative they may also be embodied in dedicated hardware or a combination of software/general purpose hardware and dedicated hardware. If embodied in dedicated hardware, the control system installer 153, option navigator 116, control system assembler 129 and other components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3–4 show the architecture, functionality, and operation of an implementation of the various components described therein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIGS. 3-4 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the control system installer 153, option navigator 116, and control system assembler 129 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the control system installer 153, option navigator 116, control system assembler 129, and other components described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. An imaging device, comprising:
a processor circuit having a processor and a memory;
a number of physical components that perform at least one imaging function, the physical components being controllably coupled to the processor circuit;
an allocated portion of memory to accommodate the storage of a control system to be installed therein; and
a control system installer stored in the memory and executable by the processor, the the control system installer comprising:
logic that downloads the control system from a remote device via a network; and
logic that installs the control system in the allocated portion of the memory;
wherein a preexisting control system is not stored in the allocated portion of memory for controlling the physical components, the physical components being inoperable to perform the at least one imaging function until the control system is installed, via the network, by the control system installer.

2. The imaging device of claim 1, logic that facilitates a user navigation through a number of control system options to select the control system to be installed in the memory.

3. The imaging device of claim 1, wherein the control system to be installed in the allocated portion of the memory controls the operation of the physical components in performing the at least one imaging function.

4. The imaging device of claim 1, wherein the imaging function comprises a printing function.

5. The imaging device of claim 1, wherein the imaging function comprises a scanning function.

6. The imaging device of claim 1, wherein the imaging function comprises a copying function.

7. The imaging device of claim 1, wherein:
the allocated portion of the memory is nonvolatile and re-writeable; and
the logic that installs the control system in the allocated portion of the memory further comprises logic that writes the control system to the allocated portion of the memory.

8. The imaging device of claim 1, wherein the allocated portion of the memory is available.

9. The imaging device of claim 1, wherein a pre-existing control system is stored in the allocated portion of the memory.

10. The imaging device of claim 1, wherein the control system installer is operative to automatically initiate downloading of the control system in response to initial startup of the imaging device.

11. The imaging device of claim 10, wherein the control system installer is further operative to download updates to the control system.

12. A method for installing a control system in an imaging device, comprising:
providing the imaging device having a processor circuit with a processor and a memory;
providing an allocated memory that comprises an allocated portion of the memory to accommodate the storage of the control system to be installed therein;
controllably coupling a number of physical components in the imaging device to the processor circuit, wherein the physical components are configured to perform at least one imaging function;
downloading the control system from a remote device via a network in response to initial startup of the imaging device; and
installing the control system in the allocated memory, wherein a preexisting control system is not stored in the allocated memory for controlling the physical components, the physical components being inoperable to perform the at least one imaging function until the control system is installed in the allocated memory.

13. The method of claim 12, further comprising performing at least one imaging function with the imaging device after the control system has been installed in the allocated memory.

14. The method of claim 13, wherein the performing of the at least one imaging function with the imaging device further comprises performing at least one of a printing function, a scanning function, and a copying function.

15. The method of claim 12, further comprising navigating through a number of control system options to select the control system to be installed in the memory.

16. The method of claim 12, further comprising controlling the operation of the physical components to perform the at least one imaging function with the control system after the control system has been installed in the allocated memory.

17. The method of claim 12, wherein the installing of the control system in the allocated memory further comprises writing the control system to the allocated memory, wherein the allocated memory is nonvolatile and re-writeable.

18. The method of claim 12, wherein the providing of the allocated memory to accommodate the storage of the control system to be installed therein further comprises providing the allocated memory in an available condition.

19. The method of claim 12, wherein the providing of the allocated memory to accommodate the storage of the control system to be installed therein further comprises providing the allocated memory with a pre-existing control system stored therein.

20. An automated installer program embodied in a computer readable medium for installing a control system in an imaging device, comprising:

code that initiates a download of the control system from a remote device via a network in response to initial startup of the imaging device, wherein the control system is configured to control a number of physical components in the imaging device, the physical components being configured to perform at least one imaging function;

code that facilitates a user navigation through a number of control system options to select the control system to be installed in an allocated memory of the imaging device;

code that generates a request to download the control system from the remote device, wherein the control system is compatible with the imaging device; and code that installs the control system in the allocated memory in the imaging device, wherein a preexisting control system is not stored in the allocated memory for controlling the physical components, the physical components being inoperable to perform the at least one imaging function until the control system is installed in the allocated memory.

21. The automated installer program embodied in the computer readable medium of claim 20, further comprising code that automatically determines a network address associated with the imaging device.

22. The automated installer program embodied in the computer readable medium of claim 20, further comprising code that inputs a network address associated with the imaging device from a user.

23. The automated installer program embodied in the computer readable medium of claim 20, wherein the code that installs the control system in the allocated memory in the imaging device further comprises code that writes the control system to the allocated memory, wherein the allocated memory is nonvolatile and re-writeable.

* * * * *

UNITED STATES PATENT AND TRADEMARK OFFICE
CERTIFICATE OF CORRECTION

PATENT NO. : 7,200,844 B2  
APPLICATION NO. : 10/215160  
DATED : April 3, 2007  
INVENTOR(S) : James Clough et al.

Page 1 of 1

It is certified that error appears in the above-identified patent and that said Letters Patent is hereby corrected as shown below:

In column 12, line 6, in Claim 1, after "processor," delete "the".

Signed and Sealed this

Ninth Day of September, 2008

JON W. DUDAS  
*Director of the United States Patent and Trademark Office*